Figure 1:
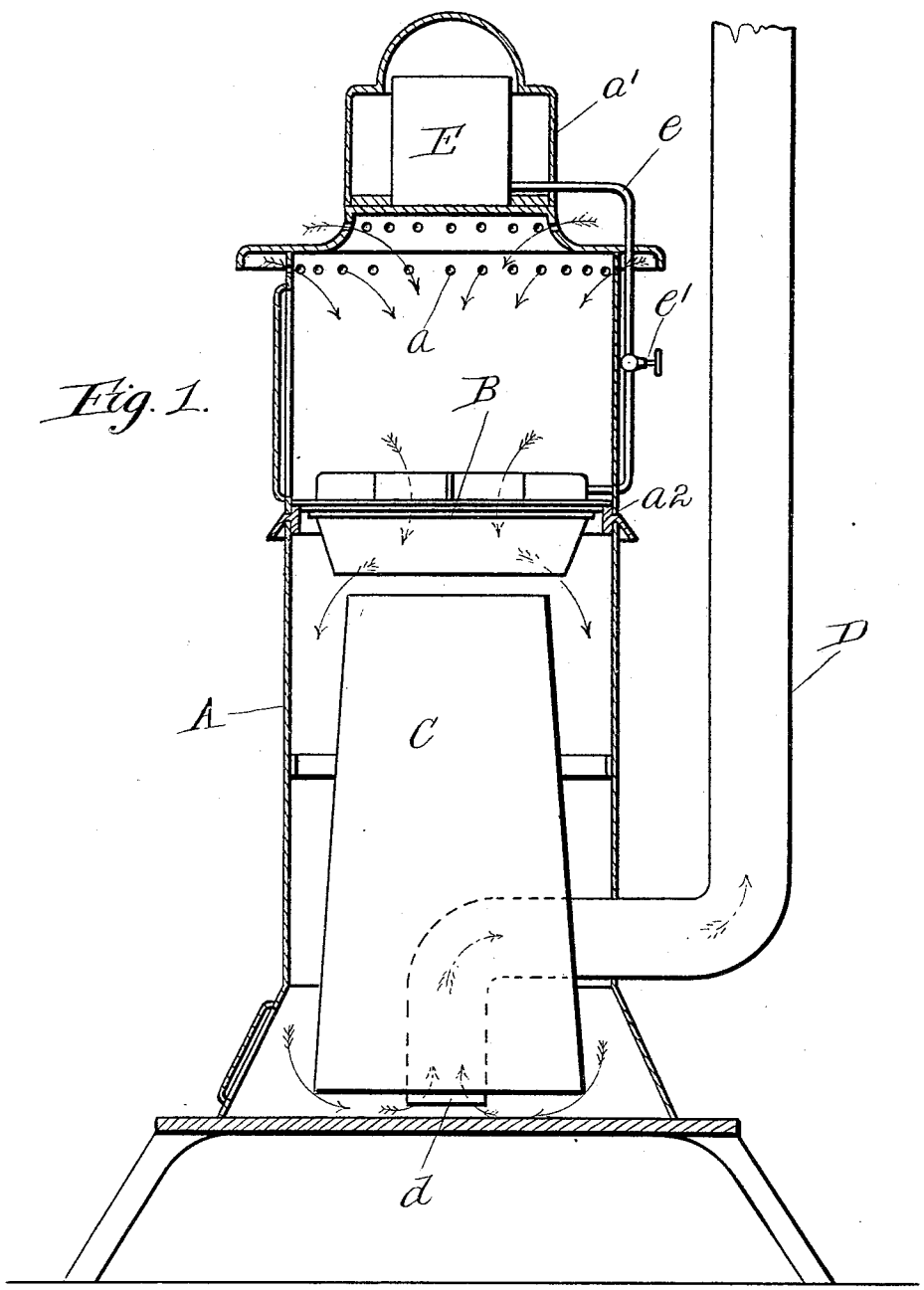

No. 618,149. Patented Jan. 24, 1899.
E. VAN NOTE.
HYDROCARBON BURNER.
(Application filed Nov. 12, 1898.)
(No Model.) 2 Sheets—Sheet 1.

Witnesses: A. F. Durand, Elva H. Ellison

Inventor: Eugene Van Note by Chas. G. Page Atty

No. 618,149. Patented Jan. 24, 1899.
E. VAN NOTE.
HYDROCARBON BURNER.
(Application filed Nov. 12, 1898.)
(No Model.) 2 Sheets—Sheet 2.
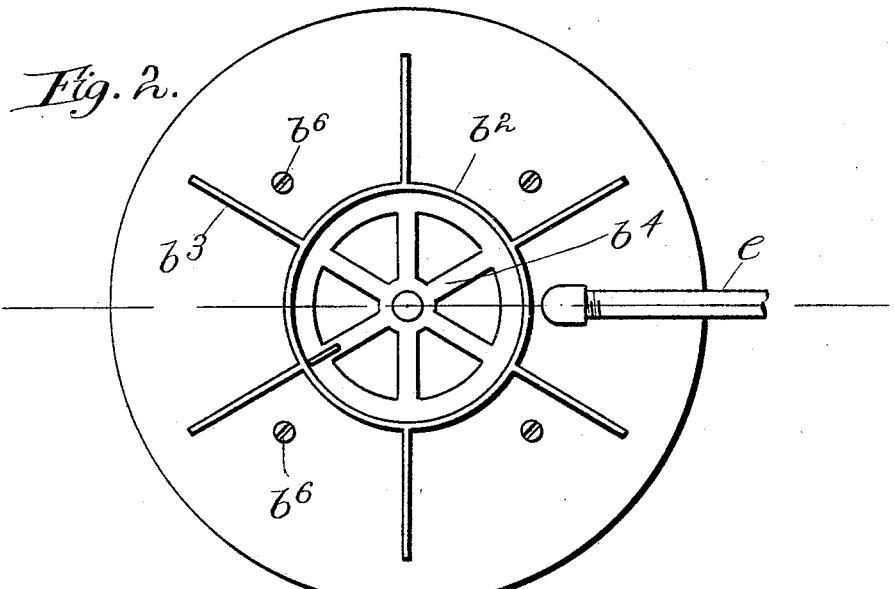
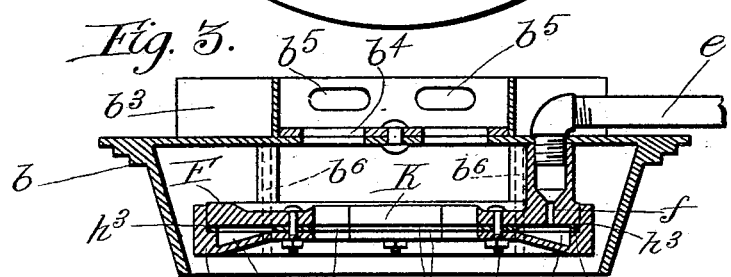
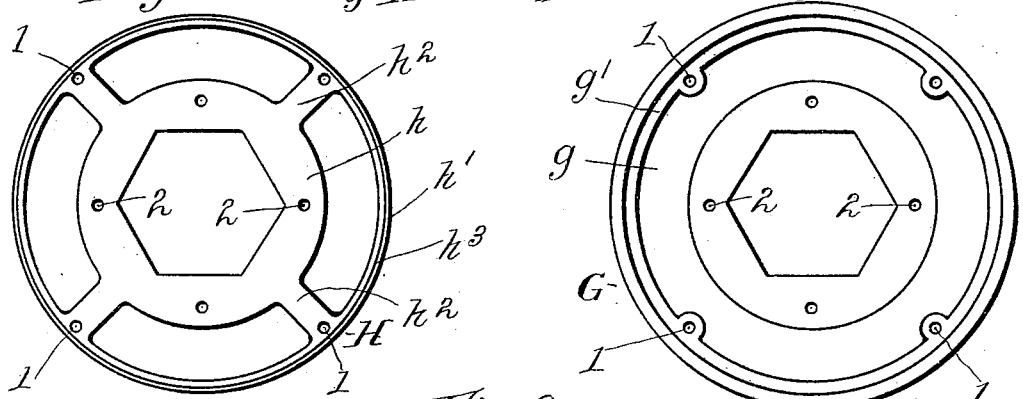
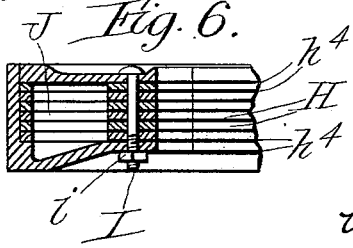
Witnesses:
A. F. Durant
Elva H. Ellison
Inventor:
Eugene Van Note.
by Chas. G. Page Atty.
THE NORRIS PETERS CO., PHOTO-LITHO., WASHINGTON, D. C.

UNITED STATES PATENT OFFICE.

EUGENE VAN NOTE, OF CHICAGO, ILLINOIS.

HYDROCARBON-BURNER.

SPECIFICATION forming part of Letters Patent No. 618,149, dated January 24, 1899.

Original application filed June 22, 1898, Serial No. 684,148. Divided and this application filed November 12, 1898. Serial No. 696,260. (No model.)

*To all whom it may concern:*

Be it known that I, EUGENE VAN NOTE, a citizen of the United States, residing at Chicago, county of Cook, State of Illinois, have invented a certain new and useful Improvement in Hydrocarbon-Burners, of which the following is a specification.

This application is filed as a division of a previous application for improvement in hydrocarbon-stoves, filed by me in the Patent Office on June 22, 1898, and serially numbered 684,148. In said previous application I have elected to claim an improvement in hydrocarbon-stoves, while in the present application I have claimed an improvement in hydrocarbon-burners.

The objects of my invention are to avoid burning the oil before the same is vaporized, to regulate or control the escape of the vapor with reference to different qualities of oil, to secure a rapid vaporization of the oil and an even flow of the vapor, to permit the relatively light and heavy vapors to burn separately, and to provide a simple and highly-efficient form of hydrocarbon-burner.

To the attainment of the foregoing and other useful ends the oil is admitted to an annular vaporizing or generating chamber arranged between upper and lower burner-plates. The said burner-plates are practically flat and ring-shaped in form, each having a central opening and the lower one of said plates being provided on its upper surface with an annular groove or gutter, which forms the generating-chamber. The vapor or gas generated by the admission of oil to the said generating-chamber is allowed to escape inwardly by way of two or more jet-openings arranged one above the other and to burn within the combustion-space afforded by the central openings in the burner-plates. Between the said upper and lower burner-plates are arranged one or more flat burner rings or plates having central openings of about the same size and shape as the openings in the upper and lower burner-plates, by which arrangement the vapor is forced to escape in the form of a plurality of thin flat layers or sheets, resulting in a plurality of flat superimposed flames. The burner-plates, with the flat burner ring or rings between them, are clamped or bound together by a number of bolts, and by tightening or loosening the nuts of certain of the said bolts the size of the jet-openings may be varied and the escape of the vapor thereby regulated with reference to different qualities of oil, a highly-volatile oil of course requiring a freer and less restricted escape in order to avoid "blowing" than one of a less degree of volatility. By thus generating the vapor or gas and forcing the same to escape between hot metallic surfaces which are in contact with each other the danger or possibility of burning the oil before it is vaporized is entirely obviated, since any oil entering the jet-openings from the generating-chamber will be spread out between the hot metallic surfaces in a number of extremely thin layers or films, and thereby be immediately vaporized.

While the meeting surfaces of the burner-plates and flat burner ring or rings are, as previously stated, in contact with one another, the said plates and rings are not clamped together sufficiently tight to prevent the escape of the vapor as fast as the same is generated—that is to say, the degree of pressure exerted by the metallic surfaces upon each other is not sufficient to prevent the gas or vapor from escaping between them in the form of a thin film or sheet. The plates and ring or rings are kept hot by the combustion of the escaping gas, and the oil upon entering the generating-chamber is vaporized by contact with the hot metal, the vapor or gas while escaping being spread out in a plurality of sheets or films much too thin to admit of any unvaporized oil escaping therewith.

The construction of the burner, involving, as it does, an annular generating-chamber having a plurality of lateral superimposed jet-openings, permits a separate burning of the relatively light and heavy vapors. Oil admitted to the generating-chamber will vaporize, and the lighter portion of the vapor will rise to the top of said chamber and escape through the upper jet opening or openings, while the heavy and perhaps less thoroughly-vaporized portion will remain below and escape through the lower jet opening or openings. This, it will be seen, results in a number of superimposed flames which are fed by vapors of different densities and which vary from a relatively hot and pure flame at the top to one of a slightly inferior character at the bottom.

In the accompanying drawings, Figure 1 is a sectional elevation of a stove or heater, illustrating one application of my improved form of burner. Fig. 2 is a plan of the burner. Fig. 3 is a central vertical section of the burner. Fig. 4 is a plan of a flat burner-ring. Fig. 5 is a top plan of the lower burner-plate. Fig. 6 is a sectional view illustrating a burner provided with a plurality of superimposed burner-rings.

The stove illustrated is particularly adapted for use in warming rooms, &c., and comprises a cylindric shell or casing A, a burner B, arranged to close or extend transversely across the combustion-chamber afforded by the casing A, a deflector C, and a smoke-pipe D. An oil-tank E is also provided for supplying the burner with the oil to be consumed. For the purpose of securing a downdraft the upper portion of the said shell or casing A is provided with a number of openings or air-inlets $a$, and the smoke-pipe D, which enters the stove at the bottom, is formed with a bent intake portion $d$. By this arrangement the draft will be from the top to the bottom of the stove and out through the smoke-pipe D in the manner indicated by the arrows. The deflector C is desirably slightly tapered from its bottom upward and is designed to force the heated gases and fumes of combustion outward against the shell or casing A, thereby materially increasing the heating capacity of the stove.

As a convenient way of supporting the oil-tank E the same is mounted upon the upper portion of the stove-casing. A removable hood $a'$ serves to inclose the said tank from view, and a pipe $e$, provided with a valve $e'$, is arranged to conduct the oil to the burner.

While I have thus described my invention in connection with a special form of heating-stove, it will be readily understood that my improved form of burner is equally applicable to cooking-stoves as well, either as an attachment or to stoves especially constructed therefor.

Referring now to Figs. 2 to 6, inclusive, the burner B consists of a body portion $b$, from which the burner proper, so to speak, is supported, the said casing or body portion $b$ being supported in turn by the annular shelf or flange $a^2$. The top plate of the body portion $b$ is provided with a circular web $b^2$ and a number of radial webs $b^3$. A damper $b^4$ serves to regulate the draft, and the circular web $b^2$ is provided with openings $b^5$ with reference to the damper. The said webs are designed to form a support for a cooking utensil, and a dish or pan when so placed upon the said burner will in no way interfere with the draft, as the openings $b^5$ insure a free and unrestricted circulation.

The burner proper preferably comprises upper and lower burner-plates F and G and one or more flat plates or burner-rings H. These burner-plates are substantially flat and provided with central openings, which latter, although shown as being polygonal in form, may be round, square, oval, or of any other shape desired. Plate G is provided with an annular groove or gutter $g$, and also with an offset or shoulder $g'$. By referring to Fig. 4 it will be seen that the burner-rings H are also provided with central openings, desirably of the same shape and size as the central openings in the burner-plates, and that the said rings, as a matter of fact, are composed of a couple of concentric rings $h$ and $h'$, connected by spider-arms $h^2$, the said ring $h$ being provided with a peripheral packing-groove $h^3$.

The burner-plates, with the burner ring or rings between them, are assembled and clamped together as shown in Fig. 3. In this figure it will be seen that the burner-ring H rests upon the seat or offset $g'$ of the plate G and that the upper plate F rests upon the said ring. It will also be observed that when so assembled the packing-groove $h^3$, in which an asbestos cord is laid, is brought into a position to most effectively prevent leakage of the oil or vapor between the outer edges of burner-plates F and G.

The burner-plates and burner ring or rings are securely clamped together by the supporting-bolts $b^6$, which extend through outer marginal holes 1 in the plates and rings. The jet-openings $h^4$ are formed by the meeting surfaces of the ring or rings $h'$ and the burner-plates, and for the purpose of slightly adjusting or varying the jet-openings with reference to the particular quality of oil in use the plates and rings are provided with holes 2, through which extend the bolts I. These bolts are provided with nuts $i$, and as the burner-plates, particularly the lower one, are thin enough to be slightly flexible a tightening or loosening of the nuts will obviously tend to vary the thickness of the films of vapor issuing from between the said plates and rings.

The generating-chamber J, as will be seen, is formed partly by the groove or gutter $g$ in the plate G and partly by the space between the two concentric rings $h$ and $h'$ of the burner-rings. A small opening or duct $f$ in the upper burner-plate permits the oil to enter the generating-chamber from the pipe $e$.

In use the burner is started by flushing or filling the generating-chamber with oil and setting fire to the latter as it leaks from between the plates and rings. After burning the oil direct in this manner for a few moments the plates and rings will become heated, and the oil in the generating-chamber will then vaporize and escape and burn within the combustion-space K formed by the central openings in the burner plates and rings. When once the burner is thoroughly heated, burning of the oil before it is vaporized will be impossible, as the oil upon entering between the hot metallic surfaces of the jet-openings will be spread out in films or sheets so thin as to be immediately vaporized, and, moreover, as previously stated, the novel construction and formation of the burner permits the relatively light and heavy vapors to burn separately, as the lighter gases or vapors rise to the top and escape directly from the generating-chamber by way of the upper jet opening or openings, while the relatively heavy gases or vapors escape through the lower jet opening or openings. The construction of the burner insures a rapid and steady vaporization of the oil and an even flow of the vapor, as the generating-chamber is located close to the flames and in the same plane as the jet-openings. This arrangement results not only in a maximum heating of the generating or vaporizing chamber, but also in permitting the vapors to escape to the combustion-space by the shortest possible route— that is to say, the vapors instead of being conducted through comparatively long and circuitous passages before being consumed are lead directly from the generating-chamber to the flames and in such way permitted to escape and burn in a plurality of flat superimposed flames without danger of chilling or condensation before being so consumed, and the less thoroughly gasified portion of the vapor, if any there be, will escape directly from the bottom of the generating-chamber, thereby bringing the "wet flame" to the bottom of the series of superimposed flames and so burn without impairing the quality of the other flame or flames.

What I claim as my invention is—

1. A hydrocarbon-burner having a generating-chamber and comprising upper and lower burner-plates; and one or more flat burner rings or plates arranged between the said upper and lower burner-plates, and adapted to provide in effect a plurality of thin jet-openings, from which the vapor escapes and burns in a plurality of flat superimposed flames; the said generating-chamber being located between the said upper and lower burner-plates, and the said jet-openings being arranged to open directly and laterally from the generating-chamber.

2. A hydrocarbon-burner having a generating-chamber and comprising upper and lower burner-plates; one or more flat burner-rings arranged between the said plates, and adapted to provide in effect a plurality of thin jet-openings through which the vapor escapes and burns in a plurality of flat superimposed flames; means for clamping the said plates and ring or rings together, and means for adjusting said clamping means for the purpose of varying the said jet-openings.

3. A hydrocarbon-burner having a generating-chamber and comprising upper and lower burner-plates, provided with central openings adapted to afford a combustion-space; and one or more flat burner-rings arranged between the said plates, and adapted to provide in effect a plurality of thin jet-openings, through which the vapor escapes and burns in a plurality of flat superimposed flames.

4. A hydrocarbon-burner comprising upper and lower burner-plates provided with central openings adapted to afford a combustion-space, the said lower burner-plate being grooved to provide a generating-chamber; one or more flat plates provided with central openings arranged between the said burner-plates, and adapted to provide in effect a plurality of thin jet-openings through which the vapor escapes and burns in a plurality of flat superimposed flames.

5. A hydrocarbon-burner comprising a body portion, a couple of burner-plates supported therefrom, and a damper arranged above the said burner-plates; one or more flat burner-rings arranged between the said plates, and adapted to provide in effect a plurality of thin jet-openings through which the vapor escapes and burns in a plurality of flat superimposed flames.

6. A hydrocarbon-burner having a generating or vaporizing chamber, and comprising upper and lower burner-plates and one or more flat burner-rings arranged between the said plates; the said lower burner-plate being provided with a groove or gutter which forms the said generating-chamber, and also with an offset or shoulder which serves as a seat for the said burner ring or rings and the said upper burner-plate; and the said burner ring or rings being adapted to provide in effect a plurality of thin jet-openings through which the vapor escapes and burns in the form of a plurality of superimposed flames.

7. In a hydrocarbon-burner having a generating-chamber, a plurality of flat superimposed plates clamped or otherwise bound together, and providing the generating-chamber in effect with a plurality of thin lateral jet-openings through which the vapor escapes directly from the said generating-chamber and burns in a plurality of flat superimposed flames.

8. In a hydrocarbon-burner, a couple of burner-plates having a generating-chamber between them; and one or more plates arranged between the said burner-plates and adapted to provide in effect a plurality of thin jet-openings, through which the vapor escapes from the said generating-chamber, and burns in a plurality of flat, superimposed flames.

9. A hydrocarbon-burner having an annular generating-chamber provided with a plurality of annular, laterally-opening, superimposed jet-openings, through which the vapors escape and burn in a plurality of flat superimposed flames; the said chamber and the said annular jet-openings being in the same plane, whereby the relatively light gases will escape through the upper jet opening or openings, while the relatively heavy gases or vapors will escape through the lower jet opening or openings.

EUGENE VAN NOTE.

Witnesses:
ARTHUR F. DURAND,
ELVA H. ELLISON.